United States Patent
Hahn

(10) Patent No.: US 11,576,166 B2
(45) Date of Patent: Feb. 7, 2023

(54) METHOD FOR SIDELINK COMMUNICATION IN CONSIDERATION OF RESOURCE OCCUPANCY STATE IN COMMUNICATION SYSTEM AND APPARATUS FOR THE SAME

(71) Applicants: Hyundai Motor Company, Seoul (KR); Kia Motors Corporation, Seoul (KR)

(72) Inventor: Gene Back Hahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 39 days.

(21) Appl. No.: 17/019,153

(22) Filed: Sep. 11, 2020

(65) Prior Publication Data
US 2021/0168769 A1    Jun. 3, 2021

Related U.S. Application Data

(63) Continuation of application No. 16/586,618, filed on Sep. 27, 2019.

(60) Provisional application No. 62/813,398, filed on Mar. 4, 2019, provisional application No. 62/738,301, filed on Sep. 28, 2018.

(30) Foreign Application Priority Data

Jul. 31, 2019    (KR) .................. 10-2019-0093306

(51) Int. Cl.
*H04W 72/04*    (2009.01)
*H04L 5/00*    (2006.01)
*H04W 72/00*    (2009.01)

(52) U.S. Cl.
CPC ......... *H04W 72/042* (2013.01); *H04L 5/0042* (2013.01); *H04W 72/005* (2013.01); *H04W 72/0446* (2013.01)

(58) Field of Classification Search
CPC ....... H04W 4/40; H04W 92/18; H04W 72/02; H04W 4/44; H04W 4/46; H04W 72/042; H04W 72/0453; H04W 4/70; H04W 72/0406; H04W 72/04; H04W 84/042
See application file for complete search history.

(56) References Cited

U.S. PATENT DOCUMENTS

| | | | |
|---|---|---|---|
| 2011/0255461 A1* | 10/2011 | Huang | H04L 5/0053 370/312 |
| 2013/0028200 A1 | 1/2013 | Nory et al. | |
| 2013/0077581 A1 | 3/2013 | Lee et al. | |

(Continued)

*Primary Examiner* — Fred A Casca
(74) *Attorney, Agent, or Firm* — Fox Rothschild LLP

(57) ABSTRACT

A sidelink communication method performed by a UE includes receiving from a base station a message including first configuration information of a common resource pool and second configuration information for an occupancy state reporting of the common resource pool. The method also includes receiving from the base station an indicator indicating resources used for sidelink communication within the common resource pool by performing a monitoring operation on resources indicated by the second configuration information and performing sidelink communication using resources other than the resources indicated by the indicator within the common resource pool indicated by the first configuration information.

10 Claims, 9 Drawing Sheets

(56) References Cited

U.S. PATENT DOCUMENTS

| | | |
|---|---|---|
| 2016/0302215 A1 | 10/2016 | Sorrentino |
| 2017/0150302 A1 | 5/2017 | Sorrentino et al. |
| 2018/0139724 A1 | 5/2018 | Loehr et al. |
| 2018/0249420 A1 | 8/2018 | Lim et al. |
| 2019/0037430 A1 | 1/2019 | Lee et al. |
| 2019/0394786 A1* | 12/2019 | Parron ............... H04L 27/0006 |
| 2020/0107303 A1 | 4/2020 | Hahn |
| 2020/0252909 A1 | 8/2020 | Yu et al. |

* cited by examiner

METHOD FOR SIDELINK COMMUNICATION IN CONSIDERATION OF RESOURCE OCCUPANCY STATE IN COMMUNICATION SYSTEM AND APPARATUS FOR THE SAME

CROSS-REFERENCE TO RELATED APPLICATIONS

This application is a Continuation Application of U.S. patent application Ser. No. 16/586,618 filed on Sep. 27, 2019, which claims the benefit of priorities to U.S. Provisional Patent Application Ser. No. 62/738,301 filed on Sep. 28, 2018 and No. 62/813,398 filed on Mar. 4, 2019 with the U.S. Patent and Trademark Office, and Korean Patent Application No. 10-2019-0093306, filed on Jul. 31, 2019 in the Korean Intellectual Property Office (KIPO), the entire contents of which are incorporated herein by reference.

BACKGROUND

1. Technical Field

The present disclosure relates generally to sidelink communication technology, and more specifically, to a technique for sidelink communication considering a resource pool occupancy state.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, a user equipment (UE) may perform V2X communication based on a sidelink transmission mode (TM) #3 or #4 (or, TM #1 or TM #2 in the NR system). When a common resource pool for sidelink communication is configured, the UE supporting the sidelink TM #3 may perform the V2X communication using resources allocated by the base station within the common resource pool. The UE that supports the sidelink TM #4 may perform the V2X communication using resources autonomously selected within the common resource pool. The resources used by the UE supporting the sidelink TM #3 may overlap with the resources used by the UE supporting the side link TM #4. In particular, the sidelink communication may not be successfully performed. Accordingly, there is a need for methods of informing the resources used for the sidelink communication.

SUMMARY

Accordingly, the present disclosure provides a method and an apparatus for sidelink communication considering a resource pool occupancy state.

According to the exemplary embodiments of the present disclosure, a sidelink communication method performed by a UE in a communication system may include receiving from a base station a message including first configuration information regarding a common resource pool and second configuration information for an occupancy state reporting of the common resource pool; receiving from the base station an indicator that indicates resources used for sidelink communication within the common resource pool by monitoring resources indicated by the second configuration information; and performing sidelink communication using resources other than the resources indicated by the indicator within the common resource pool indicated by the first configuration information.

The receiving of the indicator may include receiving from the base station a first indicator that indicates candidate resources to be used for the sidelink communication within the common resource pool; and receiving from the base station a second indicator that indicates actual resources determined to be used for the sidelink communication among the candidate resources.

The first configuration information may include information that indicates time resources of the common resource pool and information that indicates frequency resources of the common resource pool. The first configuration information may include information that indicates a common resource pool #1 for unicast transmission, information that indicates a common resource pool #2 for groupcast transmission, and information that indicates a common resource pool #3 for broadcast transmission, and the indicator may indicate resources used for the sidelink communication within one of the common resource pool #1, the common resource pool #2, and the common resource pool #3.

The second configuration information may include a transmission periodicity of the indicator, information that indicates time resources used for transmission of the indicator, information that indicates frequency resources used for transmission of the indicator, and a radio network temporary identifier (RNTI) used for the occupancy state reporting. The indicator may be a bitmap, and the bitmap may indicate an occupancy state of each of a plurality of resource groups (RGs) constituting the common resource pool. The indicator may be received using an RNTI configured for the occupancy state reporting, and the RNTI may be determined by time and frequency resource information of the common resource pool indicated by the first configuration information.

Furthermore, according to the exemplary embodiments of the present disclosure, an operation method of a base station supporting sidelink communication may include generating first configuration information that indicates a common resource pool shared for sidelink communication; generating second configuration information for an occupancy state reporting of resources constituting the common resource pool; transmitting to a user equipment (UE) a message including the first configuration information and the second configuration information; and transmitting to the UE an indicator that indicates resources used for the sidelink communication within the common resource pool through resources indicated by the second configuration information.

The transmitting of the indicator may include transmitting to the UE a first indicator that indicates candidate resources to be used for the sidelink communication within the common resource pool; and transmitting to the UE a second indicator that indicates actual resources determined to be used for the sidelink communication among the candidate resources. The second configuration information may include a transmission periodicity of the indicator, information that indicates time resources used for transmission of the indicator, information that indicates frequency resources used for transmission of the indicator, and a radio network temporary identifier (RNTI) used for the occupancy state reporting. The indicator may be a bitmap, and the bitmap may indicate an occupancy state of each of a plurality of resource groups (RGs) constituting the common resource pool.

Additionally, according to the exemplary embodiments of the present disclosure, a sidelink communication method performed by a UE may include receiving from a base station a message including first configuration information regarding a common resource pool and second configuration information for an occupancy state reporting of the common resource pool; receiving from the base station a first indicator that indicates candidate resources to be used for sidelink communication within the common resource pool; and transmitting to the base station a second indicator that indicates occupied resources used by the UE among the candidate resources through resources indicated by the second configuration information.

The first configuration information may include information that indicates a common resource pool #1 for unicast transmission, information that indicates a common resource pool #2 for groupcast transmission, and information that indicates a common resource pool #3 for broadcast transmission, and the candidate resources and the occupied resources may belong to one of the common resource pool #1, the common resource pool #2, and the common resource pool #3.

The second configuration information may include a transmission periodicity of the second indicator, information that indicates time resources used for transmission of the second indicator, information that indicates frequency resources used for transmission of the second indicator, and a radio network temporary identifier (RNTI) used for the occupancy state reporting.

Each of the first indicator and the second indicator may be a bitmap, and the bitmap may indicate a usage state or an occupancy state of each of a plurality of resource groups (RGs) constituting the common resource pool. The second indicator may be transmitted using an RNTI configured for the occupancy state reporting.

Furthermore, according to the exemplary embodiments of the present disclosure, an operation method of a base station supporting sidelink communication may include generating first configuration information that indicates a common resource pool shared for sidelink communication; generating second configuration information for an occupancy state reporting of resources constituting the common resource pool; transmitting to a user equipment (UE) a message including the first configuration information and the second configuration information; transmitting to the UE a first indicator that indicates candidate resources to be used for the sidelink communication within the common resource pool; and receiving a second indicator that indicates occupied resources used by the UE among the candidate resources through resources indicated by the second configuration information.

The second configuration information may include a transmission periodicity of the second indicator, information that indicates time resources used for transmission of the second indicator, information that indicates frequency resources used for transmission of the second indicator, and a radio network temporary identifier (RNTI) used for the occupancy state reporting.

Each of the first indicator and the second indicator may be a bitmap, and the bitmap may indicate a usage state or an occupancy state of each of a plurality of resource groups (RGs) constituting the common resource pool. The second indicator may be received using an RNTI configured for the occupancy state reporting.

Additionally, according to the exemplary embodiments of the present disclosure, a UE performing sidelink communication may include a processor, a transceiver operated by the processor, and a memory configured to store at least one instruction executable by the processor. When executed by the processor, the at least one instruction may be configured to receive from a base station a message including first configuration information regarding a common resource pool and second configuration information for an occupancy state reporting of the common resource pool; receive from the base station an indicator that indicates resources used for sidelink communication within the common resource pool by performing a monitoring operation on resources indicated by the second configuration information; and perform sidelink communication using resources other than the resources indicated by the indicator within the common resource pool indicated by the first configuration information.

When the indicator is received from the base station, the at least one processor may be further configured to receive from the base station a first indicator that indicates candidate resources to be used for the sidelink communication within the common resource pool; and receive from the base station a second indicator that indicates actual resources determined to be used for the sidelink communication among the candidate resources.

The indicator may be a bitmap, and the bitmap may indicate an occupancy state of each of a plurality of resource groups (RGs) constituting the common resource pool. The indicator may be received using an RNTI configured for the occupancy state reporting, and the RNTI may be determined by time and frequency resource information of the common resource pool indicated by the first configuration information.

Furthermore, according to the exemplary embodiments of the present disclosure, a base station supporting sidelink communication may include a processor, a transceiver operated by the processor, and a memory configured to store at least one instruction executable by the processor. When executed by the processor, the at least one instruction may be configured to generate first configuration information that indicates a common resource pool shared for sidelink communication; generate second configuration information for an occupancy state reporting of resources constituting the common resource pool; transmit to a user equipment (UE) a message including the first configuration information and the second configuration information; and transmit to the UE an indicator that indicates resources used for the sidelink communication within the common resource pool through resources indicated by the second configuration information.

When the indicator is transmitted to the UE, the at least one processor may be further configured to transmit to the UE a first indicator that indicates candidate resources to be used for the sidelink communication within the common resource pool; and transmit to the UE a second indicator that indicates actual resources determined to be used for the sidelink communication among the candidate resources.

Additionally, according to the exemplary embodiments of the present disclosure, a UE performing sidelink communication may include a processor, a transceiver operated by the processor, and a memory configured to store at least one instruction executable by the processor. When executed by the processor, the at least one instruction may be configured to receive from a base station a message including first configuration information regarding a common resource pool and second configuration information for an occupancy state reporting of the common resource pool; receive from the base station a first indicator that indicates candidate resources to be used for sidelink communication within the common resource pool; and transmit to the base station a second indicator that indicates occupied resources used by the UE among the candidate resources through resources indicated by the second configuration information.

Each of the first indicator and the second indicator may be a bitmap, and the bitmap may indicate a usage state or an occupancy state of each of a plurality of resource groups (RGs) constituting the common resource pool. The second indicator may be transmitted using an RNTI configured for the occupancy state reporting.

Furthermore, according to the exemplary embodiments of the present disclosure, a base station supporting sidelink communication may include a processor, a transceiver operated by the processor, and a memory configured to store at least one instruction executable by the processor. When executed by the processor, the at least one instruction may be configured to generate first configuration information that indicates a common resource pool shared for sidelink communication; generate second configuration information for an occupancy state reporting of resources constituting the common resource pool; transmit to a user equipment (UE) a message including the first configuration information and the second configuration information; transmit to the UE a first indicator that indicates candidate resources to be used for the sidelink communication within the common resource pool; and receive a second indicator that indicates occupied resources used by the UE among the candidate resources through resources indicated by the second configuration information.

According to the exemplary embodiments of the present disclosure, the base station may be configured to transmit to the UE information that indicates the resources used for sidelink communication within the common resource pool. The UE (e.g., UE supporting sidelink TM #4) may be configured to perform sidelink communications using the remaining resources other than the resources indicated by the base station within the common resource pool. Alternatively, the UE (e.g., UE supporting sidelink TM #4) may be configured to transmit to the base station information that indicates the resources used for sidelink communication within the common resource pool. The base station may be configured to allocate the remaining resources to other UEs (e.g., UEs supporting sidelink TM #3), except the resources indicated by the UE within the common resource pool. Therefore, the resources used by the UE supporting the sidelink TM #3 do not overlap with the resources used by the UE supporting the sidelink TM #4, and thus, the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
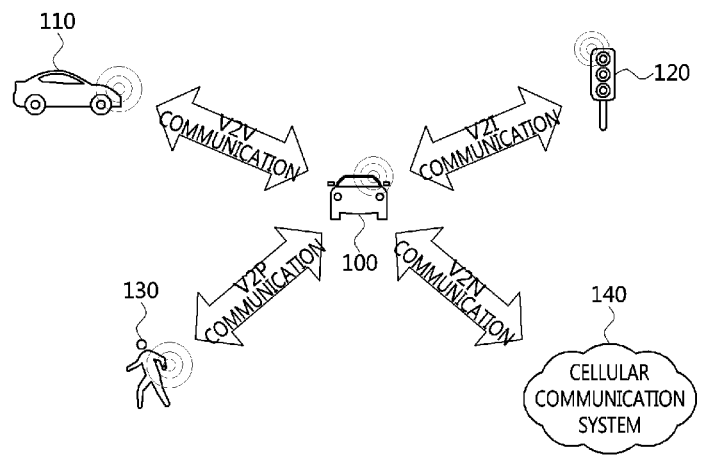
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." In particular, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node mounted within the first vehicle 100 and a communication node mounted within a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node mounted within the vehicle 100 or the communication node carried by the person 130 may be configured to generate an alarm that indicates a danger by detecting a dangerous situation based on the obtained driving information and movement information.

The V2P communications supported in the cellular communication system 140 may be performed based on sidelink communication technologies (e.g., ProSe and D2D communication technologies, and the like). In particular, the communications between the communication node mounted within the vehicle 100 and the communication node carried by the person 130 may be performed using at least one sidelink channel established between the communication nodes.

The V2N communications may be communications between the first vehicle 100 (e.g., the communication node mounted within the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
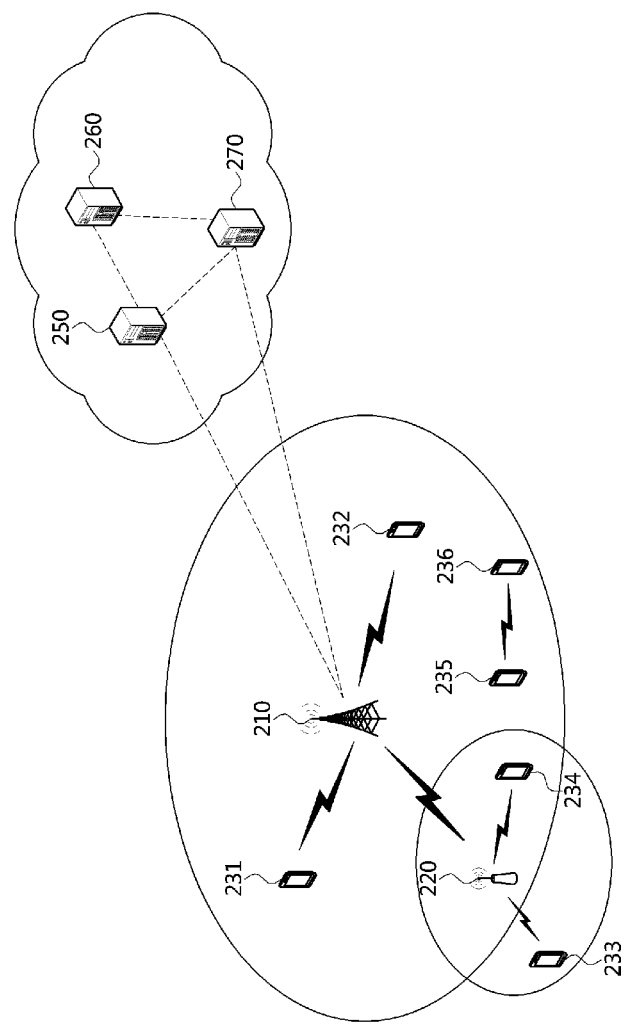
FIG. 2 is a conceptual diagram illustrating a cellular communication system according to an exemplary embodiment of the present disclosure.

Meanwhile, the cellular communication system 140 supporting the V2X communications may be configured as follows. FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes mounted within the vehicles 100 and 110 of FIG. 1, the communication node mounted within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
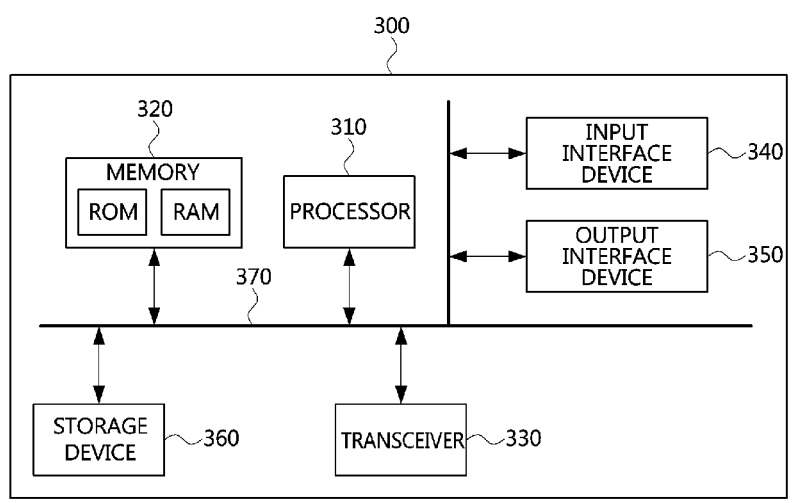
FIG. 3 is a conceptual diagram illustrating a communication node constituting a cellular communication system according to an exemplary embodiment of the present disclosure.

The communication nodes (e.g., base station, relay, UE, S-GW, P-GW, MME, UPF, SMF, AMF, etc.) including the cellular communication system may be configured as follows. FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node mounted within the first vehicle 100 of FIG. 1 and the UE 236 may be the communication node mounted within the second vehicle 110 of FIG. 1. When V2I communications are performed using the sidelink communication technique, the UE 235 may be the communication node mounted within first vehicle 100 of FIG. 1 and the UE 236 may be the communication node mounted within the infrastructure 120 of FIG. 1. When V2P communications are performed using the sidelink communication technique, the UE 235 may be the communication node mounted within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
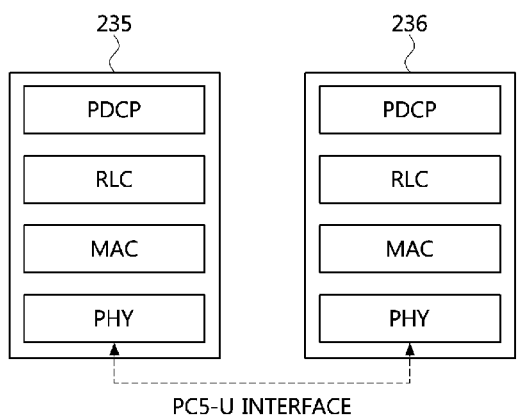
FIG. 4 is a block diagram illustrating a user plane protocol stack of an UE performing sidelink communication according to an exemplary embodiment of the present disclosure.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an identification (ID) configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
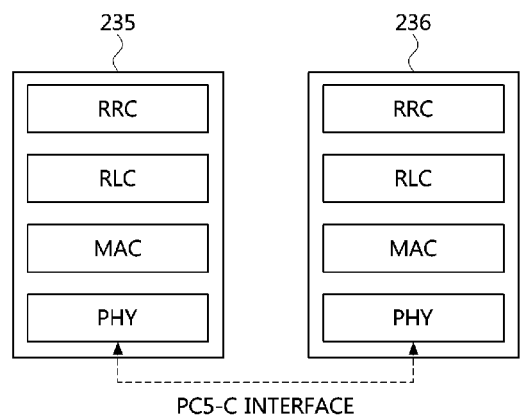
FIG. 5 is a block diagram illustrating a control plane protocol stack of an UE performing sidelink communication according to an exemplary embodiment of the present disclosure.
Figure 6:
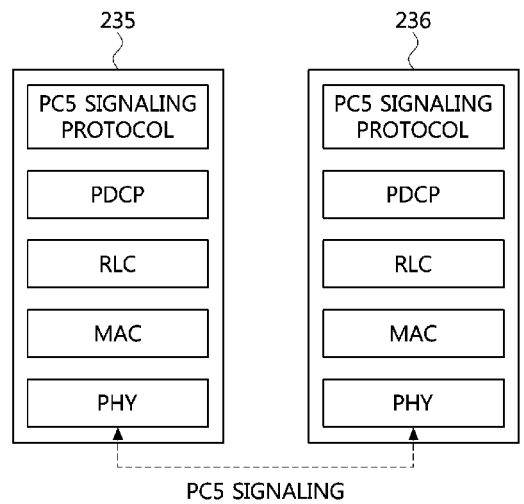
FIG. 6 is a block diagram illustrating a control plane protocol stack of an UE performing sidelink communication according to an exemplary embodiment of the present disclosure.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure.

When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may be configured to perform a method (e.g., reception or transmission of the signal) that corresponds to the method performed at the first communication node. In other words, when an operation of a UE #1 (e.g., first vehicle) is described, a corresponding UE #2 (e.g., second vehicle) may be configured to perform an operation that corresponds to the operation of the UE #1. Conversely, when an operation of the UE #2 (e.g., second vehicle) is described, the corresponding UE #1 (e.g., first vehicle) may be configured to perform an operation that corresponds to the operation of the UE #2. In the exemplary embodiments described below, the operation of the vehicle may be the operation of the communication node mounted within the vehicle.

A common resource pool shared by the UE supporting the sidelink TM #3 and the UE supporting the sidelink TM #4 may be configured. The UE supporting the sidelink TM #3 may be configured to perform V2X communication using resources allocated by the base station within the common resource pool. The UE supporting the sidelink TM #4 may be configured to perform V2X communication using resources autonomously selected within the common resource pool. The resources used by the UE supporting the sidelink TM #3 may overlap with the resources used by the UE supporting the sidelink TM #4. In particular, since the sidelink communication may not be successfully performed, methods for informing the resources used for the sidelink communication may be needed.

Information that indicates the resources used for sidelink communication may be transmitted in two schemes. In a first scheme, the base station may be configured to transmit information that indicates the resources allocated for the UE supporting the sidelink TM #3 within the common resource pool to other UEs (e.g., UE(s) supporting the sidelink TM #3 and/or UE(s) supporting the sidelink TM #4). In a second scheme, the UE supporting the sidelink TM #4 may be configured to inform the base station of the resources autonomously selected within the common resource pool.

Sidelink Communication Method Based on the Scheme #1

Figure 7:
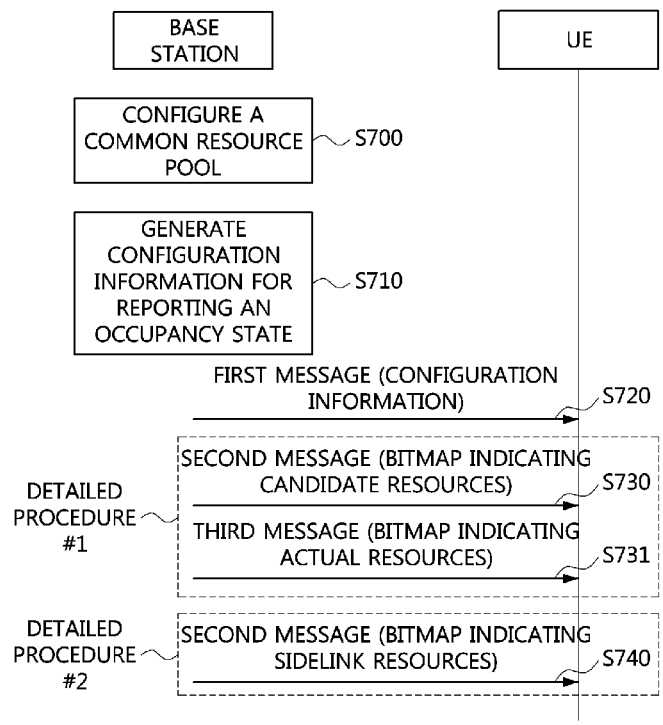
FIG. 7 is a sequence chart illustrating a first exemplary embodiment of a sidelink communication method in a communication system.

FIG. 7 is a sequence chart illustrating a first exemplary embodiment of a sidelink communication method in a communication system. As shown in FIG. 7, a communication system may include a base station and a UE. The base station may be a base station belonging to the cellular communication system 140 shown in FIG. 1, and the UE may be a UE mounted within the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

The base station may configure a common resource pool shared by the UE supporting the sidelink TM #3 and the UE supporting the sidelink TM #4 (S700). The configuration information of the common resource pool may include one or more of information elements defined in Table 3 below.

TABLE 3

| Information element | Description |
| --- | --- |
| Time information | indicate time resources (e.g., number of slots or subframes, offset, etc.) constituting the common resource pool |
| Frequency information | indicate frequency resources (e.g., number of subchannels, a staring resource block (RB) of the subchannels, a starting RB of a PSCCH, etc.) constituting the common resource pool |
| Zone identifier (ID) | Zone ID mapped to the common resource pool |

The base station may be configured to generate configuration information for occupancy state reporting of the common resource pool (S710). The configuration information for occupancy state reporting may include one or more of information elements defined in Table 4 below.

TABLE 4

| Information element | Description |
| --- | --- |
| Periodicity | Periodicity of reporting information indicating an occupancy state of the common resource pool (e.g., 5 ms, 10 ms, 15 ms, 20 ms, or the like) |
| Time information | indicate time resources (e.g., symbol index, slot index, subframe index, etc.) used for transmitting the information indicating an occupancy state of the common resource pool |
| Frequency information | indicate frequency resources (e.g., bandwidth part (BWP) index, RB index, etc.) used for transmitting the information indicating an occupancy state of the common resource pool |
| SL-RS-RNTI | An RNTI used for transmitting the information indicating an occupancy state of the common resource pool |

The sidelink-resource status-radio network temporary identifier (SL-RS-RNTI) may be calculated by the base station and the UE based on the information of time and frequency resources constituting the common resource pool. In particular, the SL-RS-RNTI may not be included in the configuration information for occupancy state reporting. For example, the SL-RS-RNTI may be calculated based on Equation 1 below. The length of the SL-RS-RNTI may be 16 bits.

$$SL\text{-}RS\text{-}RNTI = 1 + SY_{id} + 14 \times SL_{id} + 14 \times 80 \times F_n \quad \text{Equation 1}$$

wherein $SY_{id}$ may be the index of the first symbol belonging to the common resource pool in the time domain. $SL_{id}$ may be the index of the first slot in which the common resource pool is configured in the time domain. $F_n$ may be the number of subchannels constituting the common resource pool in the frequency domain.

The base station may be configured to transmit a first message including the configuration information regarding the common resource pool and the configuration information for occupancy state reporting to the UE(s) (e.g., UE(s) supporting the sidelink TM #3 and/or UE(s) supporting the sidelink TM #4) (S720). The first message may be system information (e.g., a system information block (SIB)), a radio resource control (RRC) message, a MAC control element (CE), sidelink UE information, or downlink control information (DCI). The configuration information of the common resource pool and the configuration information for the occupancy state reporting may be transmitted through one message. Alternatively, the configuration information of the common resource pool and the configuration information for the occupancy state reporting may be transmitted through different messages.

The UE (e.g., UE supporting the sidelink TM #3 and/or UE supporting the sidelink TM #4) may be configured to receive the first message from the base station, and identify the configuration information of the common resource pool and the configuration information for the occupancy state reporting, which are included in the first message. Additionally, the UE may be configured to calculate the SL-RS-RNTI based on the configuration information of the common resource pool (e.g., time/frequency resource information). For example, the UE may be configured to calculate the SL-RS-RNTI using Equation 1. On the other hand, the base station may be configured to transmit information indicating the occupancy state of the common resource pool according to a detailed procedure #1 or a detailed procedure #2.

Detailed Procedure #1

The base station may be configured to generate information indicating candidate resources to be allocated for the UE(s) within the common resource pool. The information indicating the candidate resources may be represented by a bitmap. For example, the resources constituting the common resource pool may be divided into a plurality of resource groups (RGs), and one bit in the bitmap may correspond to one RG belonging to the common resource pool. A specific bit set to '0' in the bitmap may indicate that the RG corresponding to the specific bit is not a candidate resource. A specific bit set to '1' in the bitmap may indicate that the RG corresponding to the specific bit is a candidate resource. The common resource pool composed of the plurality of RGs may be configured as follows.

Figure 8:
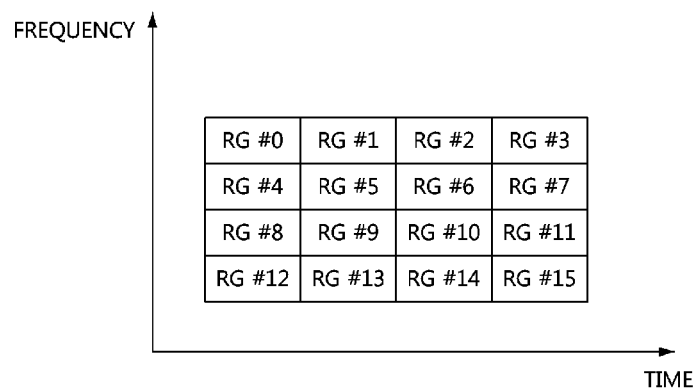
FIG. 8 is a conceptual diagram illustrating an exemplary embodiment of a common resource pool constituted by a plurality of RGs in a communication system.

FIG. 8 is a conceptual diagram illustrating an exemplary embodiment of a common resource pool constituted by a plurality of RGs in a communication system. As shown in FIG. 8, one common resource pool may include 16 RGs (e.g., RGs #0 to #15). In particular, the size of the bitmap indicating the candidate resources to be allocated for the UE within the common resource pool may be 16 bits. In the time domain, one RG may be composed of one or more symbols, one or more slots, or one or more subframes. In the frequency domain, one RG may be composed of one or more resource blocks (RBs) or one or more subchannels. When the RGs #5 to #7 are configured as the candidate resources within the common resource pool, the bitmap may be set to '0000 0111 0000 0000'.

Referring back to FIG. 7, the base station may be configured to transmit a second message including the bitmap to the UE (e.g., UE(s) supporting the sidelink TM #3 and/or UE(s) supporting the sidelink TM #4) (S730). The second message may further include information that indicates the size of sidelink data, information that indicates a transmission periodicity of the sidelink data, and the like. The second message may be transmitted using the time and frequency resources indicated by the configuration information (e.g., the information elements defined in Table 4) generated in the step S710. Further, the second message may be transmitted according to the periodicity indicated by the configuration information (e.g., the information element defined in Table 4) generated in the step S710. The second message may be system information, an RRC message, a MAC CE, sidelink UE information, or a DCI.

The UE may be configured to receive the second message from the base station, and identify the candidate resources based on the bitmap included in the second message. The UE supporting the sidelink TM #4 may be configured to perform sidelink communication using the remaining resources excluding the candidate resources indicated by the bitmap within the common resource pool.

The base station may be configured to determine resources to be actually used for the sidelink communication within the candidate resources, and may generate a bitmap indicating the resources to be actually used (simply referred to as 'actual resources'). When the candidate resources are the RGs #5 to #7 within the common resource pool shown in FIG. 8 and the actual resources are the RGs #6 and #7, the bitmap indicating the actual resources may be set to '0000 0011 0000 0000'. The base station may be configured to transmit a third message including the bitmap indicating the actual resources to the UE (e.g., UE(s) supporting the sidelink TM #3 and/or UE(s) supporting the sidelink TM #4) (S731).

The third message may be system information, an RRC message, a MAC CE, sidelink UE information, or a DCI. Particularly, the first message may be system information, the second message may be an RRC message, and the third message may be a DCI. The third message may further include an SL-RS-RNTI. For example, a cycle redundancy check (CRC) of the third message including the bitmap indicating the actual resources may be scrambled by the SL-RS-RNTI. The base station may be configured to transmit the third message with the CRC scrambled by the SL-RS-RNTI to the UE.

The UE may be configured to receive the third message from the base station, and identify the bitmap included in the third message. If the SL-RS-RNTI of the UE is the same as the SL-RS-RNTI included in the third message, the UE may be configured to acquire the bitmap included in the third message. For example, when the third message is a DCI, the UE may be configured to monitor a control resource set (CORESET) (e.g., a search space within CORESET). If a DCI is detected in the CORESET, the UE may be configured to perform a descrambling operation on the CRC of the DCI using the SL-RS-RNTI, and if the CRC result is successful, the UE may be configured to obtain the bitmap included in the DCI. The UE may be configured to identify the actual resources based on the bitmap included in the third message. The UE supporting the sidelink TM #4 may be configured to perform sidelink communication using resources other than the actual resources indicated by the bitmap within the common resource pool.

Detailed Procedure #2

The base station may be configured to generate information indicating resources to be used for sidelink communications (i.e., actual resources) within the common resource pool. The information that indicates the resources may be represented by a bitmap. When the RGs #8 to #10 shown in FIG. 8 are used for sidelink communication, the bitmap may be set to '0000 0000 1110 0000'.

The base station may be configured to transmit a second message including the bitmap to the UE (e.g., UE(s) supporting the sidelink TM #3 and/or UE(s) supporting the sidelink TM #4) (S740). The second message may be transmitted using the time and frequency resources indicated by the configuration information (e.g., the information elements defined in Table 4) generated in the step S710. Further, the second message may be transmitted according to the periodicity indicated by the configuration information (e.g., the information element defined in Table 4) generated in the step S710. The second message may be system information, an RRC message, a MAC CE, sidelink UE information, or a DCI. The second message may include an SL-RS-RNTI. For example, a CRC of the second message may be scrambled using the SL-RS-RNTI.

The UE may be configured to receive the second message from the base station, and identify the bitmap included in the second message. If the SL-RS-RNTI of the UE is the same as the SL-RS-RNTI included in the second message, the UE may be configured to acquire the bitmap included in the second message. For example, when the second message is detected, the UE may be configured to perform a descrambling operation on the CRC of the second message using the SL-RS-RNTI, and if the CRC result is successful, the UE may be configured to obtain the bitmap included in the second message. The UE may be configured to identify the actual resources based on the bitmap included in the second message. The UE supporting the sidelink TM #4 may be configured to perform sidelink communication using resources other than the actual resources indicated by the bitmap within the common resource pool.

Sidelink Communication Method Based on the Scheme #2

Figure 9:
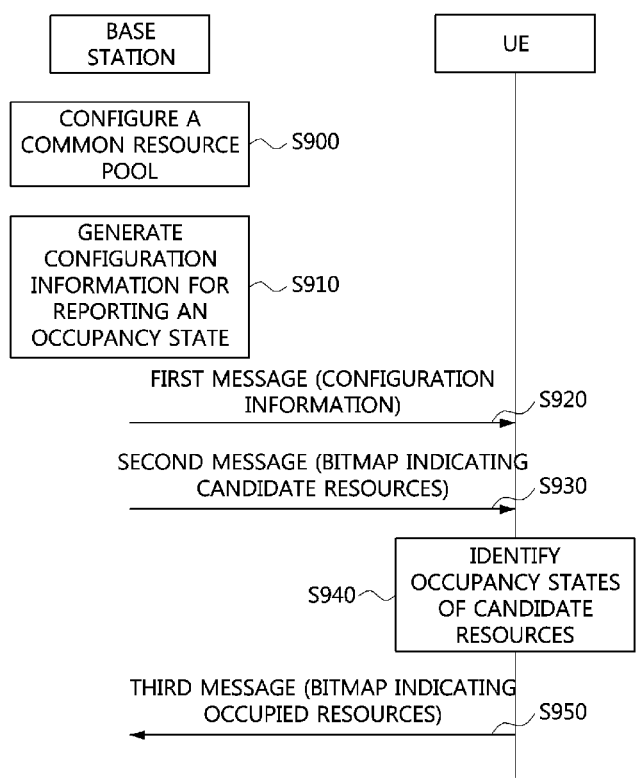
FIG. 9 is a sequence chart illustrating a second exemplary embodiment of a sidelink communication method in a communication system.

FIG. 9 is a sequence chart illustrating a second exemplary embodiment of a sidelink communication method in a communication system. As shown in FIG. 9, a communication system may include a base station and a UE. The base station may be a base station belonging to the cellular communication system 140 shown in FIG. 1, and the UE may be a UE mounted within the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

The base station may configure a common resource pool shared by the UE supporting the sidelink TM #3 and the UE supporting the sidelink TM #4 (S900). The configuration information of the common resource pool may include one or more of information elements defined in Table 3. For example, the configuration information of the common resource pool may include at least one of the time information, the frequency information, and the zone ID.

The base station may be configured to generate configuration information for occupancy state reporting of the common resource pool (S910). The configuration information for occupancy state reporting may include one or more of the information elements defined in Table 4. For example, the configuration information for occupancy state reporting may include at least one of the periodicity, the time information, the frequency information, and the SL-RS-RNTI. Additionally, the configuration information for occupancy state reporting may further include an indicator for requesting an occupancy state reporting of the common resource pool. The SL-RS-RNTI may be calculated by the base station and the UE based on the time and frequency resource information constituting the common resource pool. In particular, the SL-RS-RNTI may not be included in the configuration information for occupancy state reporting. For example, the SL-RS-RNTI may be calculated based on Equation 1.

The base station may be configured to transmit a first message including the configuration information of the common resource pool and the configuration information for occupancy state reporting to the UE(s) (e.g., UE(s) supporting the sidelink TM #3 and/or UE(s) supporting the sidelink TM #4) (S920). The first message may be system information (e.g., SIB)), an RRC message, a MAC CE, sidelink UE information, or a DCI. The configuration information of the common resource pool and the configuration information for the occupancy state reporting may be transmitted through one message. Alternatively, the configuration information of the common resource pool and the configuration information for the occupancy state reporting may be transmitted through different messages.

The UE (e.g., UE supporting the sidelink TM #3 and/or UE supporting the sidelink TM #4) may be configured to receive the first message from the base station, and identify the configuration information of the common resource pool and the configuration information for the occupancy state reporting, which are included in the first message. Additionally, the UE may be configured to calculate the SL-RS-RNTI based on the configuration information of the common resource pool (e.g., time/frequency resource information). For example, the UE may be configured to calculate the SL-RS-RNTI using Equation 1.

The base station may be configured to generate information indicating candidate resources to be allocated for the UE within the common resource pool. The information that indicates the candidate resources may be represented by a bitmap. As shown in FIG. 8, the common resource pool may include a plurality of RGs, and one bit in the bitmap may correspond to one RG belonging to the common resource pool. A specific bit set to '0' in the bitmap may indicate that the RG corresponding to the specific bit is not a candidate resource. A specific bit set to '1' in the bitmap may indicate that the RG corresponding to the specific bit is a candidate resource. When the RGs #5 to #7 are configured as the candidate resources in the common resource pool, the bitmap may be set to '0000 0111 0000 0000'.

The base station may be configured to transmit a second message including the bitmap to the UE (e.g., UE(s) supporting the sidelink TM #3 and/or UE(s) supporting the sidelink TM #4) (S930). The second message may further include information indicating the size of sidelink data, information indicating a transmission periodicity of the sidelink data, and the like. Additionally, the second message may further include an SL-RS-RNTI. For example, a CRC of the second message may be scrambled by the SL-RS-RNTI. The second message may be system information, an RRC message, a MAC CE, sidelink UE information, or a DCI.

The UE may be configured to receive the second message from the base station, and identify the bitmap included in the second message. If the SL-RS-RNTI of the UE is the same as the SL-RS-RNTI included in the second message, the UE may be configured to acquire the bitmap included in the second message. For example, when the second message is detected, the UE may be configured to perform a descrambling operation on the CRC of the second message using the SL-RS-RNTI, and if the CRC result is successful, the UE may be configured to obtain the bitmap included in the second message. The UE may be configured to identify the candidate resources based on the bitmap included in the second message.

The UE may be configured to identify the occupancy state (e.g., the use state) of the candidate resources indicated by the bitmap (S940). Alternatively, when a separate indicator requesting occupancy state reporting is received from the base station, the UE may be configured to identify the occupancy state of the candidate resources. The separate indicator requesting occupancy state reporting may be received through system information, an RRC message, a MAC CE, sidelink UE information, or a DCI. When the bitmap is set to '0000 0111 0000 0000', the UE may be configured to identify the occupancy state of the RGs #5 to #7 shown in FIG. 8. The UE may be configured to generate a bitmap indicating the resources occupied (e.g., used) by the UE among the candidate resources configured by the base station. When the RGs #5 and #6 are occupied by the UE, the bitmap may be set to '0000 0110 0000 0000'.

Alternatively, the step S930 may be omitted. In particular, the UE may be configured to identify the occupancy state of all the resources (e.g., the RGs #0 to #15 shown in FIG. 8) constituting the common resource pool instead of the candidate resources. When the RGs #5, #6, #10, and #11 are occupied by the UE, the bitmap may be set to '0000 0110 0011 0000'.

The UE may be configured to transmit a third message including the bitmap that indicates the resources occupied by the UE to the base station (S950). The third message may be transmitted using the time and frequency resources indicated by the configuration information (e.g., the information elements defined in Table 4) for occupancy state reporting obtained from the first message. Additionally, the third message may be transmitted according to a periodicity indicated by the configuration information (e.g., the information element defined in Table 4) for occupancy state reporting obtained from the first message. The third message may further include information that indicates the size of sidelink data transmitted by the UE, information that indicates a transmission periodicity of the sidelink data, and the like. In addition, the third message may include an SL-RS-RNTI. For example, a CRC of the third message may be scrambled by the SL-RS-RNTI. The third message may be transmitted via an uplink channel (e.g., a physical uplink shared channel (PUSCH) or a physical uplink control channel (PUCCH)).

The base station may be configured to receive the third message from the UE by performing a monitoring operation on the resources indicated by the configuration information generated in the step S910. If the SL-RS-RNTI of the base station is equal to the SL-RS-RNTI included in the third message, the base station may be configured to obtain the bitmap that indicates the occupied resources from the third message. For example, the base station may be configured to perform a descrambling operation on the CRC of the third message using the SL-RS-RNTI, and if the CRC result is successful, the base station may be configured to obtain the bitmap indicating the occupied resources from the third message.

The base station may configure sidelink resources as the remaining resources other than the occupied resources indicated by the third message among the candidate resources, and may be configured to transmit configuration information of the sidelink resources to the UE(s) supporting the sidelink TM #3.

Meanwhile, a common resource pool may be configured according to a transmission scheme (e.g., a unicast scheme, a groupcast scheme, and a broadcast scheme). In this case, the common resource pool may be configured as follows.

Figure 10:
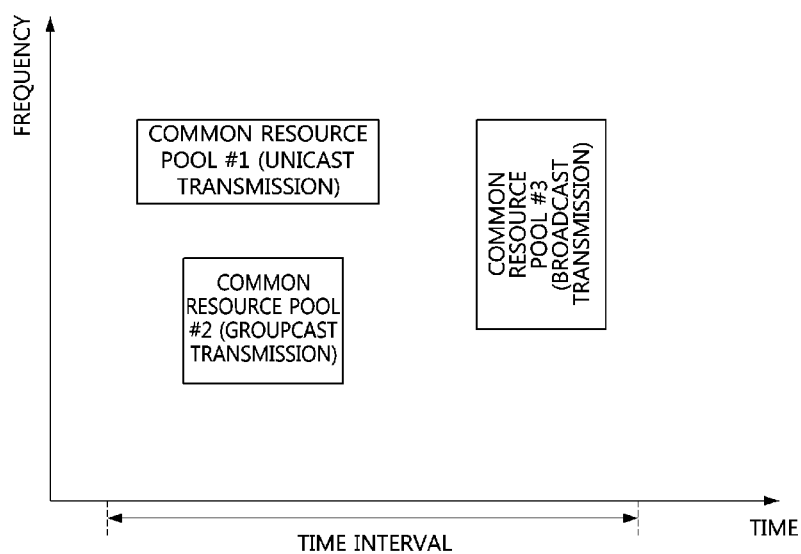
FIG. 10 is a conceptual diagram illustrating an exemplary embodiment of a common resource pool configured according to a transmission scheme in a communication system.

FIG. 10 is a conceptual diagram illustrating an exemplary embodiment of a common resource pool configured according to a transmission scheme in a communication system. As shown in FIG. 10, a common resource pool #1 for unicast transmission, a common resource pool #2 for groupcast transmission, and a common resource pool #3 for broadcast transmission may be configured. The UE may be configured to transmit a sidelink signal and/or channel in the unicast scheme using resources belonging to the common resource pool #1. The UE may be configured to transmit a sidelink signal and/or channel in the groupcast scheme by using resources belonging to the common resource pool #2. The UE may be configured to transmit a sidelink signal and/or channel in the broadcast scheme using resources belonging to the common resource pool #3.

The resources constituting the common resource pools #1, #2, and #3 may not overlap with each other. Alternatively, some of the resources constituting the common resource pools #1, #2, and #3 may overlap with each other. The common resource pools #1, #2, and #3 may be configured within a time interval, and may be repeated in units of the time interval. The duration of the time interval may be 5 ms, 10 ms, 15 ms, 20 ms, or the like.

The common resource pools (e.g., the common resource pools #1, #2, and #3 shown in FIG. 10) configured according to the transmission scheme may be shared by the UE supporting the sidelink TM #4 and the UE supporting the sidelink TM #3. In particular, the resources used by the UE supporting the sidelink TM #3 may overlap with the resources used by the UE supporting the sidelink TM #4, so that the sidelink communication may not be successfully performed. Accordingly, information regarding the resources used for the sidelink communication may be transmitted according to a scheme #3 or a scheme #4 as follows.

In the scheme #3, the base station may be configured to transmit information that indicates the resources allocated for the UE supporting the sidelink TM #3 within the common resource pool according to the transmission scheme to other UEs (e.g., UE(s) supporting the sidelink TM #3 and/or UE(s) supporting the sidelink TM #4). In the scheme #4, the UE supporting the sidelink TM #4 may be configured to inform the base station of the resources autonomously selected within the common resource pool for each transmission scheme.

Sidelink Communication Method Based on the Scheme #3

Figure 11:
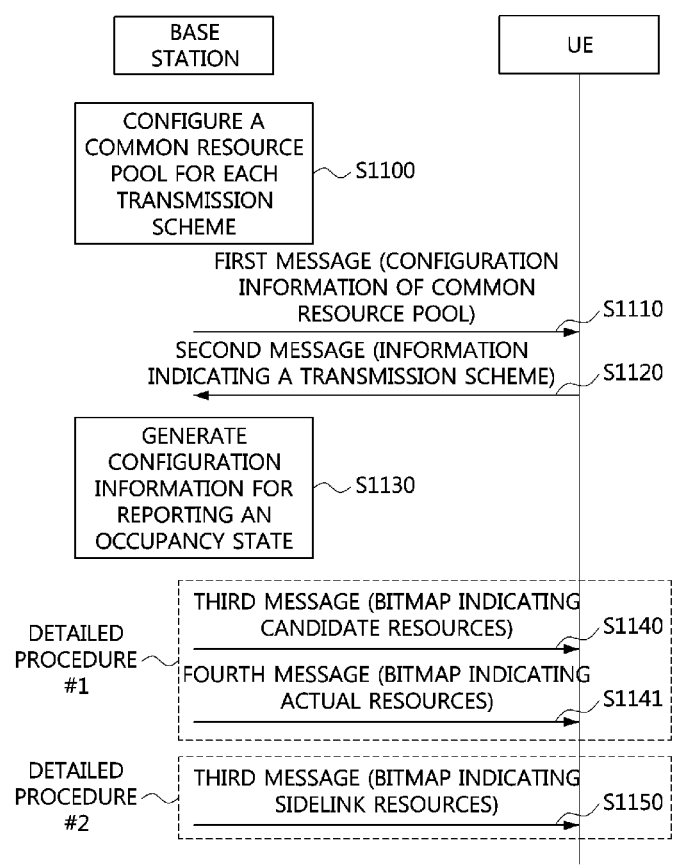
FIG. 11 is a sequence chart illustrating a third exemplary embodiment of a sidelink communication method in a communication system.

FIG. 11 is a sequence chart illustrating a third exemplary embodiment of a sidelink communication method in a communication system. As shown in FIG. 11, a communication system may include a base station and a UE. The base station may be a base station belonging to the cellular communication system 140 shown in FIG. 1, and the UE may be a UE located in the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

The base station may configure a common resource pool for each transmission scheme (S1100). The common resource pool for each transmission scheme may be shared by the UE supporting the sidelink TM #3 and the UE supporting the sidelink TM #4. The configuration information of the common resource pool may include one or more of information elements defined in Table 5 below.

TABLE 5

| Information element | | Description |
| --- | --- | --- |
| Common resource pool #1 (unicast) | Time information | indicate time resources (e.g., number of slots or subframes, offset, etc.) constituting the common resource pool #1 |
| | Frequency information | indicate frequency resources (e.g., number of subchannels, a starting RB of the subchannels, a starting RB of a PSCCH, etc.) constituting the common resource pool #1 |
| | Zone ID | Zone ID mapped to the common resource pool #1 |
| | SL-RS-RNTI | An ID used for identifying the common resource pool #1 |
| Common resource pool #2 (groupcast) | Time information | indicate time resources (e.g., number of slots or subframes, offset, etc.) constituting the common resource pool #2 |
| | Frequency information | indicate frequency resources (e.g., number of subchannels, a starting RB of the subchannels, a starting RB of a PSCCH, etc.) constituting the common resource pool #2 |
| | Zone ID | Zone ID mapped to the common resource pool #2 |
| | SL-RS-RNTI | An ID used for identifying the common resource pool #2 |
| Common resource pool #3 (broadcast) | Time information | indicate time resources (e.g., number of slots or subframes, offset, etc.) constituting the common resource pool #3 |
| | Frequency information | indicate frequency resources (e.g., number of subchannels, a starting RB of the subchannels, a starting RB of a PSCCH, etc.) constituting the common resource pool #3 |
| | Zone ID | Zone ID mapped to the common resource pool #3 |
| | SL-RS-RNTI | An ID used for identifying the common resource pool #3 |

The SL-RS-RNTI may be configured differently in each of the common resource pools. The SL-RS-RNTI may be determined based on Equation 1. The base station may be configured to transmit a first message including configuration information of the common resource pools to the UE (S1110). The first message may be transmitted through system information, an RRC message, a MAC CE, sidelink UE information, or a DCI.

The UE may be configured to receive the first message from the base station, and identify the configuration information of the common resource pools according to the transmission scheme included in the first message. When the configuration information of the common resource pools does not include the SL-RS-RNTI, the UE may be configured to calculate the SL-RS-RNTI by applying the time and frequency resource information indicated by the configuration information of the common resource pools to Equation 1. The UE may be configured to determine a transmission scheme (e.g., a unicast scheme, a groupcast scheme, or a broadcast scheme) for sidelink communication, and may transmit a second message to the base station that includes information that indicates the determined transmission scheme (S1120).

Alternatively, the second message may include information that indicates a common resource pool corresponding to the determined transmission scheme. For example, the information included in the second message may be the SL-RS-RNTI mapped to the corresponding common resource pool. The second message may be transmitted to the base station via an uplink channel (e.g., PUSCH or PUCCH). For example, the second message may be sidelink UE information.

The base station may be configured to receive the second message from the UE, and may identify the transmission scheme used by the UE based on the information included in the second message. Additionally, the base station may be configured to identify a common resource pool (e.g., the common resource pool #1, #2, or #3 shown in FIG. 10) mapped to the determined transmission scheme, and generate configuration information for occupancy state reporting of the identified common resource pool (S1130). The configuration information for occupancy state reporting may include one or more of the information elements defined in Table 4.

Meanwhile, the base station may be configured to transmit information indicating the occupancy state of the common resource pool according to a detailed procedure #1 or a detailed procedure #2.

Detailed Procedure #1

The base station may be configured to generate information that indicates candidate resources to be allocated for the UE within the common resource pool. The information that indicates the candidate resources may be represented by a bitmap. The common resource pool may include a plurality of RGs as shown in FIG. 8, and one bit in the bitmap may correspond to one RG belonging to the common resource pool. A specific bit set to '0' in the bitmap may indicate that the RG corresponding to the specific bit is not a candidate resource. A specific bit set to '1' in the bitmap may indicate that the RG corresponding to the specific bit is a candidate resource. When the RGs #5 to #7 are configured as candidate resources in the common resource pool, the bitmap may be '0000 0111 0000 0000'.

The base station may be configured to transmit a third message including the bitmap to the UE (e.g., UE(s) supporting the sidelink TM #3 and/or UE(s) supporting the sidelink TM #4) (S1140). The third message may further include information that indicates the size of sidelink data, information indicating a transmission periodicity of the sidelink data, and the like. The third message may be transmitted using the time and frequency resources indicated by the configuration information (e.g., the information elements defined in Table 4) generated in the step S1130. Further, the third message may be transmitted according to the periodicity indicated by the configuration information (e.g., the information element defined in Table 4) generated in the step S1130. The third message may be system information, RRC message, MAC CE, sidelink UE information, or DCI.

The UE may be configured to receive the third message from the base station, and identify the candidate resources based on the bitmap included in the third message. The UE supporting the sidelink TM #4 may be configured to perform sidelink communication using the remaining resources excluding the candidate resources indicated by the bitmap within the common resource pool.

The base station may be configured to determine resources to be actually used for the sidelink communication within the candidate resources, and generate a bitmap indicating the actual resources. When the candidate resources are RGs #5 to #7 within the common resource pool shown in FIG. 8 and the actual resources are RGs #6 and #7, the bitmap indicating the actual resources may be set to '0000 0011 0000 0000'. The base station may be configured to transmit a fourth message including the bitmap that indicates the actual resources to the UE (e.g., UE supporting the sidelink TM #3 and/or UE supporting the sidelink TM #4) (S731).

The fourth message may be system information, an RRC message, a MAC CE, sidelink UE information, or a DCI. The fourth message may further include an SL-RS-RNTI. For example, a CRC of the fourth message including the bitmap that indicates the actual resources may be scrambled by the SL-RS-RNTI. The base station may be configured to transmit the fourth message with the CRC scrambled by the SL-RS-RNTI to the UE.

The UE may be configured to receive the fourth message from the base station, and identify the bitmap included in the fourth message. If the SL-RS-RNTI of the UE is the same as the SL-RS-RNTI included in the fourth message, the UE may be configured to acquire the bitmap included in the fourth message. For example, when the fourth message is a DCI, the UE may be configured to monitor a CORESET (e.g., a search space within CORESET). If a DCI is detected in the CORESET, the UE may be configured to perform a descrambling operation on the CRC of the DCI using the SL-RS-RNTI, and if the CRC result is successful, the UE may be configured to obtain the bitmap included in the DCI. The UE may be configured to identify the actual resources based on the bitmap included in the fourth message. The UE supporting the sidelink TM #4 may be configured to perform sidelink communication using resources other than the actual resources indicated by the bitmap within the common resource pool.

Detailed Procedure #2

The base station may be configured to generate information that indicates resources to be used for sidelink communications (i.e., actual resources) within the common resource pool. The information that indicates the resources may be represented by a bitmap. When the RGs #8 to #10 shown in FIG. 8 are used for sidelink communication, the bitmap may be set to '0000 0000 1110 0000'.

The base station may be configured to transmit a third message including the bitmap to the UE (e.g., UE supporting the sidelink TM #3 and/or UE supporting the sidelink TM #4) (S1150). The third message may be transmitted using the time and frequency resources indicated by the configuration information (e.g., the information elements defined in Table 4) generated in the step S1130. Further, the third message may be transmitted according to the periodicity indicated by the configuration information (e.g., the information element defined in Table 4) generated in the step S1130. The third message may be system information, RRC message, MAC CE, sidelink UE information, or DCI. The third message may include an SL-RS-RNTI. For example, the CRC of the third message may be scrambled using the SL-RS-RNTI.

The UE may be configured to receive the third message from the base station, and identify the bitmap included in the third message. If the SL-RS-RNTI of the UE is the same as the SL-RS-RNTI included in the third message, the UE may be configured to acquire the bitmap included in the third message. For example, when the third message is detected, the UE may be configured to perform a descrambling operation on the CRC of the third message using the SL-RS-RNTI, and if the CRC result is successful, the UE may be configured to obtain a bitmap included in the third message. The UE may be configured to identify actual resources based on the bitmap included in the third message. The UE supporting the sidelink TM #4 may be configured to perform sidelink communication using resources other than the actual resources indicated by the bitmap within the common resource pool.

Sidelink Communication Method Based on the Scheme #4

Figure 12:
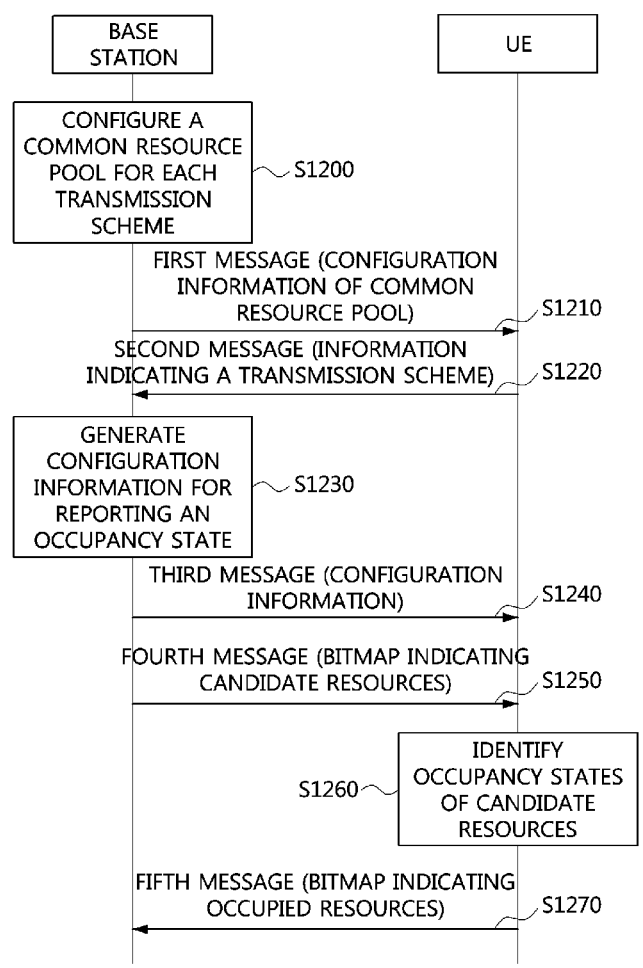
FIG. 12 is a sequence chart illustrating a fourth exemplary embodiment of a sidelink communication method in a communication system.

FIG. 12 is a sequence chart illustrating a fourth exemplary embodiment of a sidelink communication method in a communication system. As shown in FIG. 12, a communication system may include a base station and a UE. The base station may be a base station belonging to the cellular communication system 140 shown in FIG. 1, and the UE may be a UE located in the vehicle 100 shown in FIG. 1. For example, the base station may be the base station 210 shown in FIG. 2, and the UE may be one of the UEs 231 to 236 shown in FIG. 2. Each of the base station and the UE may be configured to be the same as or similar to the communication node 300 shown in FIG. 3. The UE may support the protocol stacks shown in FIGS. 4 to 6.

The base station may configure a common resource pool for each transmission scheme (S1200). The common resource pool for each transmission scheme may be shared by the UE supporting the sidelink TM #3 and the UE supporting the sidelink TM #4. The configuration information of the common resource pool may include one or more of information elements defined in Table 5. The SL-RS-RNTI may be configured differently in each of the common resource pools. The SL-RS-RNTI may be determined based on Equation 1. The base station may transmit a first message including configuration information of the common resource pools to the UE (S1210). The first message may be transmitted through system information, an RRC message, a MAC CE, sidelink UE information, or a DCI.

The UE may be configured to receive the first message from the base station, and identify the configuration information of the common resource pools according to the transmission scheme included in the first message. When the configuration information of the common resource pools does not include the SL-RS-RNTI, the UE may be configured to calculate the SL-RS-RNTI by applying the time and frequency resource information indicated by the configuration information of the common resource pools to Equation 1. The UE may be configured to determine a transmission scheme (e.g., a unicast scheme, a groupcast scheme, or a broadcast scheme) for sidelink communication, and may be configured to transmit a second message to the base station that includes information that indicates the determined transmission scheme (S1220).

Alternatively, the second message may include information that indicates a common resource pool corresponding to the determined transmission scheme. For example, the information included in the second message may be the SL-RS-RNTI mapped to the corresponding common resource pool. The second message may be transmitted to the base station via an uplink channel (e.g., PUSCH or PUCCH). For example, the second message may be sidelink UE information.

The base station may be configured to receive the second message from the UE, and identify the transmission scheme used by the UE based on the information included in the second message. Additionally, the base station may be configured to identify a common resource pool (e.g., the common resource pool #1, #2, or #3 shown in FIG. 10) mapped to the determined transmission scheme, and generate configuration information for occupancy state reporting of the identified common resource pool (S1230). The configuration information for occupancy state reporting may include one or more of the information elements defined in Table 4. The base station may be configured to transmit a third message including the configuration information for occupancy state reporting to the UE (S1240). The third message may be system information, an RRC message, a MAC CE, sidelink UE information, or a DCI. The UE may be configured to receive the third message from the base station, and identify the configuration information for occupancy state reporting included in the third message.

The base station may be configured to generate information that indicates candidate resources to be allocated for the UE within the common resource pool. The information that indicates the candidate resources may be represented by a bitmap. The common resource pool may include a plurality of RGs as shown in FIG. 8, and one bit in the bitmap may correspond to one RG belonging to the common resource pool. A specific bit set to '0' in the bitmap may indicate that the RG corresponding to the specific bit is not a candidate resource. A specific bit set to '1' in the bitmap may indicate that the RG corresponding to the specific bit is a candidate resource. When the RGs #5 to #7 are configured as the candidate resources in the common resource pool, the bitmap may be set to '0000 0111 0000 0000'.

The base station may be configured to transmit a fourth message including the bitmap to the UE (e.g., UE(s) supporting the sidelink TM #3 and/or UE(s) supporting the sidelink TM #4) (S1250). The fourth message may further include information that indicates the size of sidelink data, information that indicates a transmission periodicity of the sidelink data, and the like. Additionally, the fourth message may further include an SL-RS-RNTI. For example, a CRC of the fourth message may be scrambled by the SL-RS-RNTI. The fourth message may be system information, RRC message, MAC CE, sidelink UE information, or DCI.

The UE may be configured to receive the fourth message from the base station, and identify the bitmap included in the fourth message. If the SL-RS-RNTI of the UE is the same as the SL-RS-RNTI included in the fourth message, the UE may be configured to acquire the bitmap included in the fourth message. For example, when the fourth message is detected, the UE may be configured to perform a descrambling operation on the CRC of the fourth message using the SL-RS-RNTI, and if the CRC result is successful, the UE may be configured to obtain the bitmap included in the fourth message. The UE may be configured to identify the candidate resources based on the bitmap included in the fourth message.

The UE may be configured to identify the occupancy state (e.g., the use state) of the candidate resources indicated by the bit map (S1260). Alternatively, when a separate indicator requesting occupancy state reporting is received from the base station, the UE may identify the occupancy state of the candidate resources. The separate indicator requesting occupancy state reporting may be received through system information, an RRC message, a MAC CE, sidelink UE information, or a DCI. When the bitmap is set to '0000 0111 0000 0000', the UE may be configured to identify the occupancy state of the RGs #5 to #7 shown in FIG. 8. The UE may be configured to generate a bitmap indicating the resources occupied (e.g., used) by the UE among the candidate resources configured by the base station. When the RGs #5 and #6 are occupied by the UE, the bitmap may be set to '0000 0110 0000 0000'.

Alternatively, the step S1250 may be omitted. In particular be configured to, the UE may identify the occupancy state of all the resources (e.g., the RGs #0 to #15 shown in FIG. 8) constituting the common resource pool instead of the candidate resources. When the RGs #5, #6, #10, and #11 are occupied by the UE, the bitmap may be set to '0000 0110 0011 0000'.

The UE may be configured to transmit a fifth message including the bitmap indicating the resources occupied by the UE to the base station (S1270). The fifth message may be transmitted using the time and frequency resources indicated by the configuration information (e.g., the information elements defined in Table 4) for occupancy state reporting obtained from the third message. Additionally, the fifth message may be transmitted according to a periodicity indicated by the configuration information (e.g., the information element defined in Table 4) for occupancy state reporting obtained from the third message.

The fifth message may further include information that indicates a size of sidelink data transmitted by the UE, information that indicates a transmission periodicity of the sidelink data, and the like. Additionally, the fifth message may further include an SL-RS-RNTI. For example, a CRC of the fifth message may be scrambled by the SL-RS-RNTI. The fifth message may be transmitted via an uplink channel (e.g., PUSCH or PUCCH).

The base station may be configured to receive the fifth message from the UE by monitoring the resources indicated by the configuration information generated in the step S1230. If the SL-RS-RNTI of the base station is equal to the SL-RS-RNTI included in the fifth message, the base station may be configured to obtain the bitmap indicating the occupied resources from the fifth message. For example, the base station may be configured to perform a descrambling operation on the CRC of the fifth message using the SL-RS-RNTI, and if the CRC result is successful, the base station may be configured to obtain the bitmap that indicates the occupied resources from the fifth message.

The base station may configure sidelink resources as the remaining resources other than the occupied resources indicated by the fifth message among the candidate resources, and be configured to transmit configuration information of the sidelink resources to the UE(s) supporting the side link TM #3.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A sidelink communication method performed by a user equipment (UE) in a communication system, comprising:
receiving, by a processor included in the UE, system information including common configuration information of the sidelink communication from a base station, wherein the common configuration information includes information of a first common resource pool for a unicast, information of a second common resource pool for a groupcast, and information of a third common resource pool for a broadcast;
setting, by the processor, a cast type for the sidelink communication configured by the common configuration information;
generating, by the processor, a message including information that indicates the cast type;
transmitting, by the processor, the message to the base station; and
receiving, by the processor, configuration information of an occupancy state measurement for the sidelink communication according to the cast type from the base station,
wherein the cast type indicates the broadcast, the groupcast, or the unicast, and the sidelink communication is performed according to the cast type indicated by the message, and
wherein the first common resource pool is used for the sidelink communication based on the unicast, the second common resource pool is used for the sidelink communication based on the groupcast, and the third common resource pool is used for the sidelink communication based on the broadcast.

2. The sidelink communication method according to claim 1, wherein the message is a sidelink UE information message.

3. The sidelink communication method according to claim 1, further comprising:
receiving, by the processor, an indicator indicating resources used for the sidelink communication within each of the first common resource pool, the second common resource pool, or the third common resource pool from the base station; and
performing, by the processor, the sidelink communication using resources other than the resources indicated by the indicator within each of the first common resource pool, the second common resource pool, and the third common resource pool,
wherein the sidelink communication is performed according to the cast type.

4. The sidelink communication method according to claim 1, wherein the common configuration information includes information that indicates time resources of each of the first common resource pool, the second common resource pool, and the third common resource pool and information that indicates frequency resources of each of the first common resource pool, the second common resource pool, and the third common resource pool.

5. The sidelink communication method according to claim 1, further comprising:
transmitting, by the processor, information indicating occupied resources used by the UE within each of the first common resource pool, the second common resource pool, or the third common resource pool to the base station.

6. A sidelink communication method performed by a base station in a communication system, comprising:

transmitting, by a processor included in the base station, system information including common configuration information of the sidelink communication to a user equipment (UE), wherein the common configuration information includes information of a first common resource pool for n unicast, information of a second common resource pool for a groupcast, and information of a third common resource pool for a broadcast;

receiving, by the processor, a message including information that indicates a cast type for the sidelink communication configured by the common configuration information from the UE;

identifying, by the processor, the cast type for the UE indicated by the message; and transmitting, by the processor, configuration information of an occupancy state measurement for the sidelink communication according to the cast type to the UE, wherein the cast type indicates the broadcast, the groupcast, or the unicast, the sidelink communication is performed according to the cast type indicated by the message, the first common resource pool is used for the sidelink communication based on the unicast, the second common resource pool is used for the sidelink communication based on the groupcast, and the third common resource pool is used for the sidelink communication based on the broadcast.

7. The sidelink communication method according to claim 6, wherein the message is a sidelink UE information message.

8. The sidelink communication method according to claim 6, further comprising:

transmitting, by the processor, an indicator indicating resources used for the sidelink communication within the first common resource pool, the second common resource pool, or the third common resource pool to the UE.

9. The sidelink communication method according to claim 6, wherein the common configuration information includes information that indicates time resources of each of the first common resource pool, the second common resource pool, and the third common resource pool and information that indicates frequency resources of each of the first common resource pool, the second common resource pool, and the third common resource pool.

10. The sidelink communication method according to claim 6, further comprising:

receiving, by the processor, information indicating occupied resources used by the UE within each of the first common resource pool, the second common resource pool, or the third common resource pool from the UE.

* * * * *